United States Patent
Mutnury et al.

(10) Patent No.: US 9,218,309 B2
(45) Date of Patent: Dec. 22, 2015

(54) SYSTEMS AND METHODS FOR IMPEDANCE MATCHING FOR MULTI-DROP TOPOLOGIES

(71) Applicant: Dell Products L.P., Round Rock, TX (US)

(72) Inventors: Bhyrav M. Mutnury, Round Rock, TX (US); Stuart Allen Berke, Austin, TX (US); Douglas S. Winterberg, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 373 days.

(21) Appl. No.: 13/777,130

(22) Filed: Feb. 26, 2013

(65) Prior Publication Data

US 2014/0244883 A1     Aug. 28, 2014

(51) Int. Cl.
*H01P 5/12*     (2006.01)
*G06F 13/40*     (2006.01)

(52) U.S. Cl.
CPC ..................... *G06F 13/40* (2013.01)

(58) Field of Classification Search
CPC .. G06F 13/40; G06F 13/4072; G06F 13/4086
USPC .............. 710/305; 326/30; 333/125–128, 136
See application file for complete search history.

(56) References Cited

U.S. PATENT DOCUMENTS 3,694,775 A * 9/1972 Rogers ........................... 333/101

* cited by examiner

*Primary Examiner* — Robert Pascal
*Assistant Examiner* — Kimberly Glenn
(74) *Attorney, Agent, or Firm* — Jackson Walker L.L.P.

(57) ABSTRACT

In accordance with embodiments of the present disclosure, a system may include a driver, a plurality of drops, and a plurality of transmission lines, including one transmission line between the driver and one of the plurality of drops and one transmission line between successive adjacent drops. Each particular transmission line of the plurality of transmission lines may be manufactured to have a desired impedance based on a corresponding effective impedance as seen at a drop located on an end of the particular transmission line furthest from the driver in a direction away from the driver.

14 Claims, 3 Drawing Sheets

SYSTEMS AND METHODS FOR IMPEDANCE MATCHING FOR MULTI-DROP TOPOLOGIES

TECHNICAL FIELD

The present disclosure relates in general to information handling systems, and more particularly to a system and method for impedance matching for multi-drop topologies used in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include numerous information handling resources for carrying out various functionality of the information handling system. The various information handling resources may be communicatively coupled to one another via various busses and interfaces. One type of bus often used in information handling systems is a multi-drop bus. A multi-drop bus (sometimes abbreviated "MDB") is a communications bus in which all components are coupled to the same set of electrical wires or traces. Multi-drop busses are preferable in many applications as they often have the advantage of simplicity, scalability, and extensibility.

However, one of the major disadvantages of a multi-drop bus is its relatively poor electrical margin, which occurs as a result of reflections at each of the drops (or loads) along the bus. Such disadvantage becomes even more pronounced with increased signals speeds across the bus, limiting attainable operating frequencies under traditional approaches and topologies.

SUMMARY

In accordance with the teachings of the present disclosure, the disadvantages and problems associated with signal reflections in multi-drop busses have been reduced or eliminated.

In accordance with embodiments of the present disclosure, a system may include a driver, a plurality of drops, and a plurality of transmission lines, including one transmission line between the driver and one of the plurality of drops and one transmission line between successive adjacent drops. Each particular transmission line of the plurality of transmission lines may be manufactured to have a desired impedance based on a corresponding effective impedance as seen at a drop located on an end of the particular transmission line furthest from the driver in a direction away from the driver.

In accordance with these and other embodiments of the present disclosure, an information handling system may include a processor and an information handling resource communicatively coupled to the processor. The information handling resource may include a multi-drop bus having a driver, a plurality of drops, and a plurality of transmission lines, including one transmission line between the driver and one of the plurality of drops and one transmission line between successive adjacent drops. Each particular transmission line of the plurality of transmission lines may be manufactured to have a desired impedance based on a corresponding effective impedance as seen at a drop located on an end of the particular transmission line furthest from the driver in a direction away from the driver.

In accordance with these and other embodiments of the present disclosure, a method may include calculating, for one or more particular drops in a multi-drop bus, a corresponding effective impedance as seen at the drop in a direction away from a driver driving a signal onto the multi-drop bus. The method may further comprise manufacturing, based on the corresponding effective impedance, a transmission line for which the drop is at an end of the transmission line furthest from the driver.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more busses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

Figure 1:
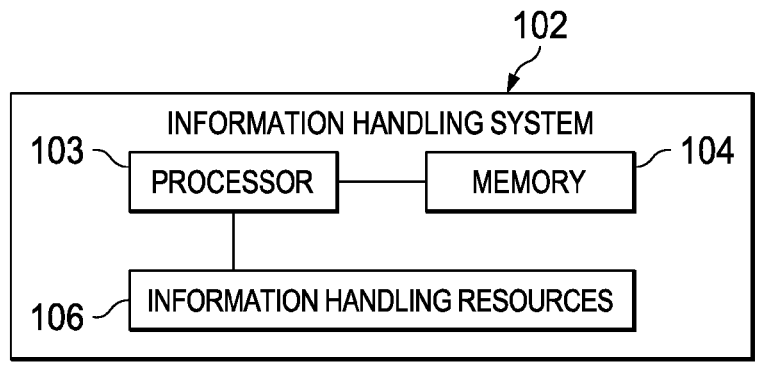
FIG. 1 illustrates a block diagram of an example information system, in accordance with one or more embodiments of the present disclosure.

FIG. 1 illustrates a block diagram of an example information system 102, in accordance with one or more embodiments of the present disclosure. In some embodiments, information handling system 102 may be a server. In other embodiments, information handling system 102 may be a personal computer. In particular embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, and one or more information handling resources 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another information handling resource 106 of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

One or more information handling resources 106 may be communicatively coupled to processor 103 and may include one or more processors, service processors, basic input/output systems, busses, memories, I/O devices and/or interfaces, storage resources, network interfaces, motherboards, and/or any other components and/or elements suitable for use in information handling system 102.

Memory 104 and/or one or more of information handling resources 106 may be implemented using a multi-drop bus. For example, many types of memory, including double data rate (DDR) memory, are commonly implemented using multi-drop busses. An example of a memory implemented in multi-drop topology is depicted in FIG. 2.

Figure 2:
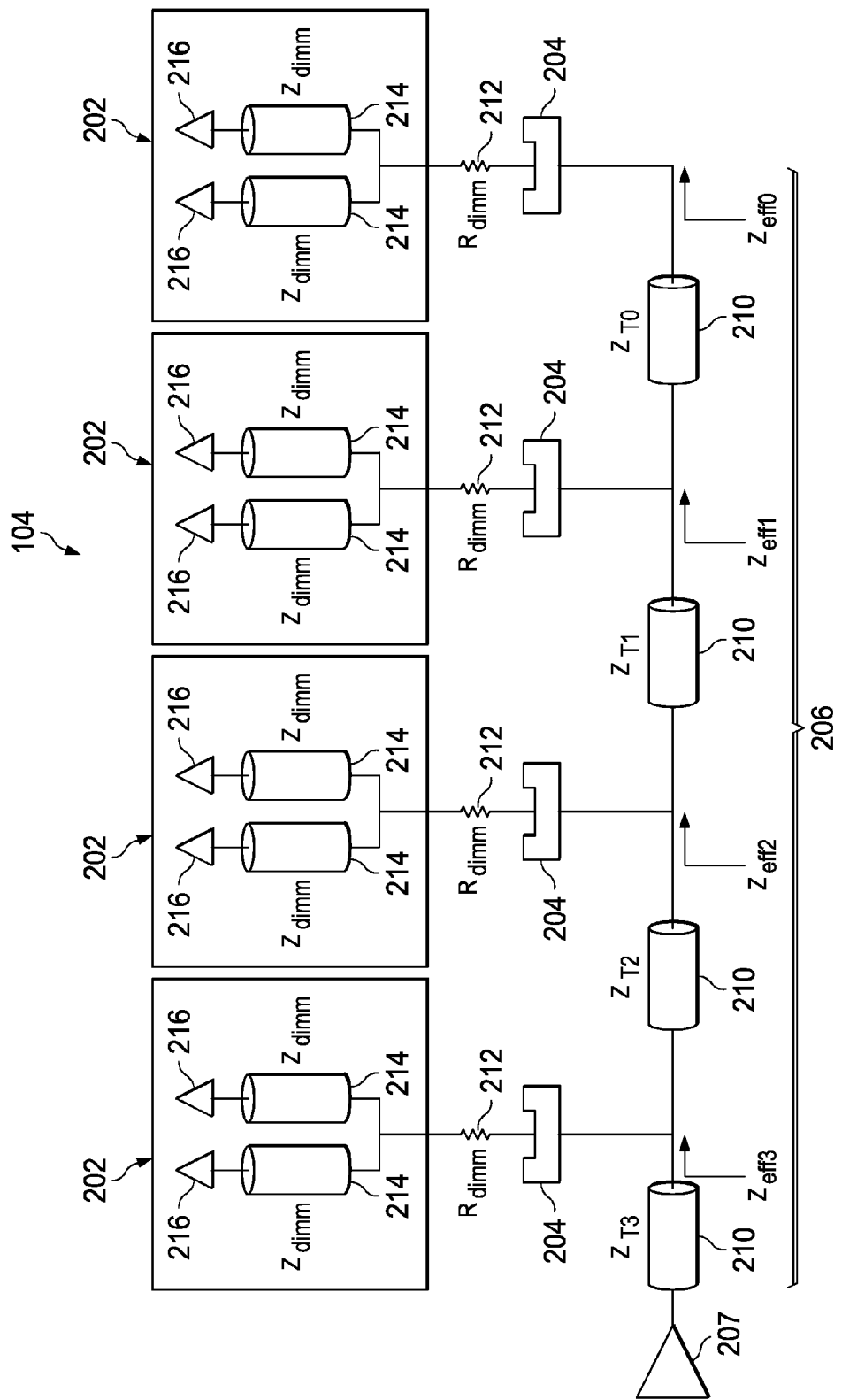
FIG. 2 illustrates a block diagram of various impedances present in a multi-drop bus topology, in accordance with one or more embodiments of the present disclosure.

FIG. 2 illustrates a block diagram of various impedances present in a multi-drop bus topology (e.g., a memory 104 implemented in a multi-drop bus technology), in accordance with one or more embodiments of the present disclosure. In such a topology, a multi-drop bus 206 may have a plurality of drops at which dual inline memory modules (DIMMs) 202 may couple to multi-drop bus 206 via corresponding connectors 204.

A DIMM 202 may include a printed circuit board or other system, device, or apparatus whereupon one or more memory integrated circuits configured to store data and/or instructions for a period of time (e.g., static random access memory, dynamic random access memory, FLASH, and/or other suitable type of memory) may be mounted and/or formed. DIMM 202 may be electrically coupled to multi-drop bus 206 and mechanically coupled to a motherboard or other printed circuit board comprising multi-drop bus 206 via connector 204. For example, each DIMM 204 may include an edge connector configured to mount DIMM 202 in connector 204.

A connector 204 may be mounted on a printed circuit board (e.g., a motherboard) and may be constructed to mechanically couple a DIMM 202 to the printed circuit board upon which connector 204 is mounted and to electrically couple such DIMM 202 to multi-drop bus 206. In some embodiments, a connector 204 may include a slot or other opening configured to removably receive a corresponding mating edge connector of a DIMM 202.

In operation, driver 207 may drive a signal onto multi-drop bus 206, and such signal may be received by a receiver 216 of the intended DIMM 202 of the signal. Driver 207 may comprise any suitable system, device, or apparatus for driving a signal communicated from another component of information handling system 102 (e.g., processor 103), and conditioning the signal (e.g., amplifying and/or repeating) for communication to DIMMs 202. A receiver 216 may comprise any suitable system, device, or apparatus for receiving a signal communicated from a driver 207.

As shown in FIG. 2, various portions of memory 104 may have an associated impedance. For example, each portion of multi-drop bus 206 between each successive drop may have a transmission line 210, with impedance values $Z_{T0}$, $Z_{T1}$, $Z_{T2}$, $Z_{T3}$, etc. As another example, each connector 204 may have a resistance 212, with a resistance value $R_{dimm}$. As a further example, each rank of a DIMM 202 may have a transmission line 214 with an impedance value $Z_{dimm}$. The various impedance values shown in FIG. 2 are merely exemplary, and memory 104 may include other impedances not explicitly shown in FIG. 2.

Also as shown in FIG. 2, each drop may have an effective impedance (e.g., $Z_{eff0}$, $Z_{eff1}$, $Z_{eff2}$, $Z_{eff3}$, etc.) seen at the drop which is equal to the parallel combination of: (i) the impedance of a DIMM 202 coupled at the drop (e.g., $R_{dimm}+Z_{dimm}/2$), and (ii) if applicable, the sum of the effective impedance of the next successive drop in a direction away from driver 207 and the transmission line impedance between the drop and the next successive drop (e.g., for a drop I, $Z_{Ti-1}+Z_{effi-1}$). Thus, for example, the effective resistance $Z_{eff0}$ at a drop furthest away from driver 207 may equal $Z_{eff0}=R_{dimm}+Z_{dimm}/2$, while the effective resistance $Z_{eff1}$ at the next successive drop in the direction towards driver 207 may equal $Z_{eff1}=[(Z_{T0}+Z_{eff0})(R_T+R_{dimm}+Z_{dimm}/2)]/[(Z_{T0}+Z_{eff0})+(R_{dimm}+Z_{dimm}/2)]$.

In accordance with the present disclosure, during manufacture of memory 104, each transmission line impedance may be manufactured to have an impedance matched to the effective impedance seen at the end of the transmission line furthest from driver 207, as described in greater detail below with respect to FIG. 3.

Figure 3:
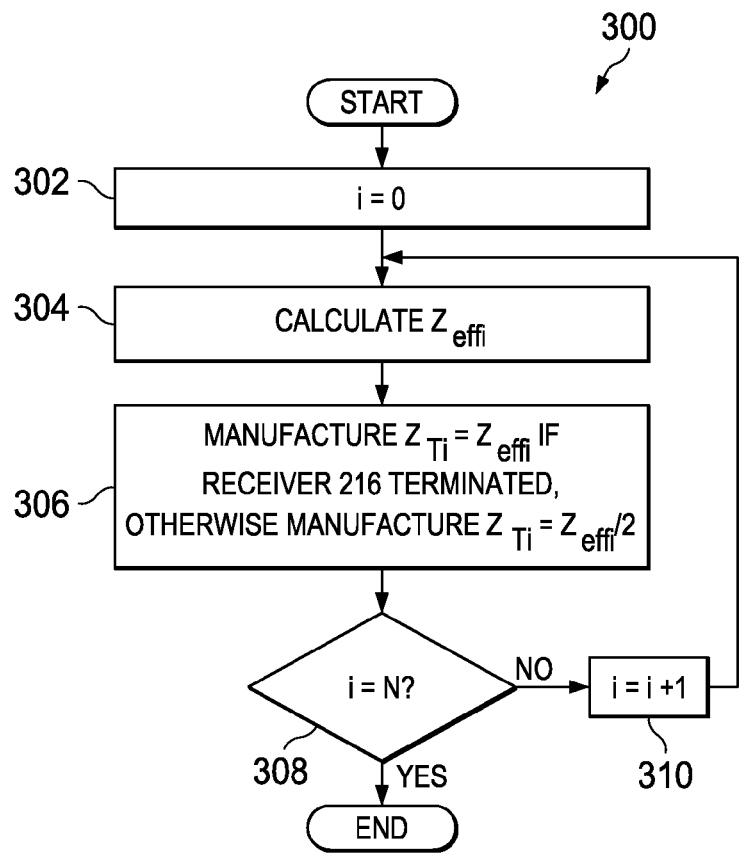
FIG. 3 illustrates a flow chart of an example method for impedance matching in a unidirectional multi-drop bus, in accordance with one or more embodiments of the present disclosure.

FIG. 3 illustrates a flow chart of an example method 300 for impedance matching in a unidirectional multi-drop bus, in accordance with one or more embodiments of the present disclosure. According to some embodiments, method 300 preferably begins at step 302. Teachings of the present disclosure may be implemented in a variety of configurations of multi-drop busses. As such, the preferred initialization point for method 300 and the order of the steps comprising method 300 may depend on the implementation chosen.

At step 302, a variable i, representing a particular drop under consideration, may be initialized to zero. Zero corresponds to a drop on multi-drop bus 206 furthest from driver 207. A constant N, which is discussed elsewhere below, may represent total number of drops present on multi-drop bus 206. At step 304, an impedance value $Z_{effi}$ for an effective resistance seen at drop i in a direction away from driver 207 may be calculated.

At step 306, a transmission line of multi-drop bus 206 between drop i and next successive drop i+1 (or in the case where i=N, a transmission line between drop i and driver 207) may be manufactured based on the value of $Z_{effi}$. For example, if a receiver 216 associated with the effective impedance $Z_{effi}$ is terminated, the transmission line may be manufactured such that its impedance 210 has a value $Z_{Ti}=Z_{effi}$. On the other hand, if a receiver 216 associated with the effective impedance $Z_{effi}$ is not terminated, the transmission line may be manufactured such that its impedance 210 has a value $Z_{Ti}=Z_{effi}/2$. Any suitable method may be used to manufacture a transmission line of multi-drop bus 206 with its desired impedance, including manufacturing a printed circuit board trace comprising the portion of multi-drop bus 206 corresponding to the transmission line to a particular trace width.

At step 308, it may be determined whether all N drops of multi-drop bus 206 have been considered. If all drops have been considered, method 300 may end. Otherwise, method 300 may proceed to step 310.

At step 310, the variable i may be incremented by one, and steps 304 through 308 may repeat for the next successive drop.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using any system operable to implement method 300. In certain embodiments, method 300 may be implemented partially or fully in software and/or firmware embodied in computer-readable media. In these and other embodiments, method 300 may be performed in whole or part by an information handling system, for example information handling system 102 depicted in FIG. 1.

Approaches similar to those described above may also be employed to calculate desired transmission line impedances in bidirectional multi-drop busses, as is described in greater detail with respect to FIG. 4, below.

Figure 4:
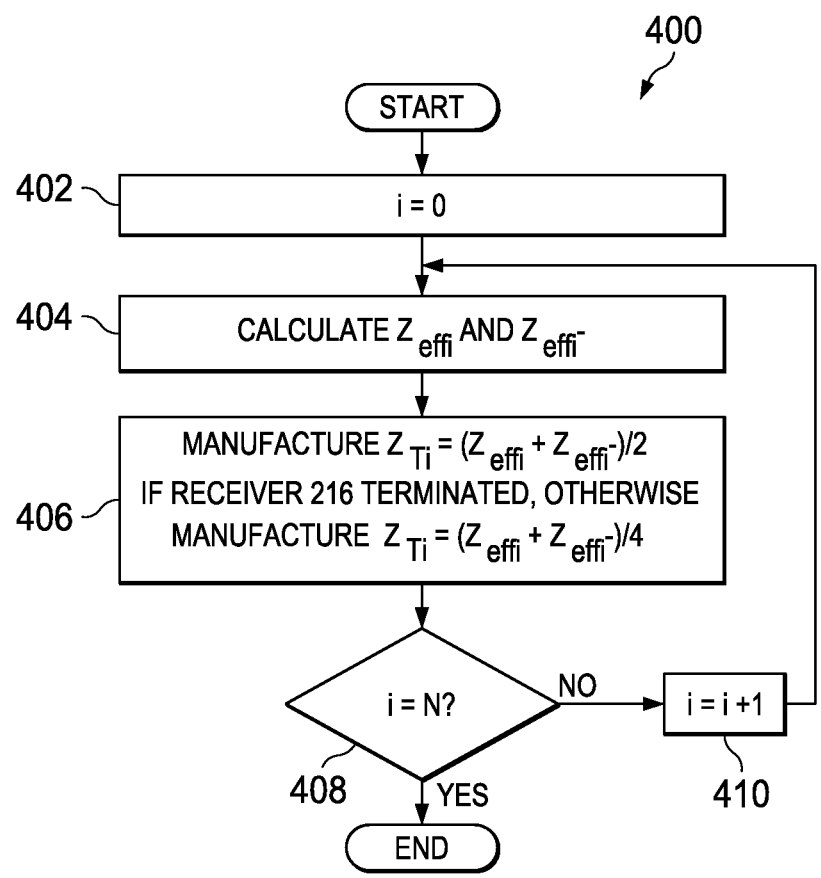
FIG. 4 illustrates a flow chart of an example method for impedance matching in a bidirectional multi-drop bus, in accordance with one or more embodiments of the present disclosure.

FIG. 4 illustrates a flow chart of an example method 400 for impedance matching in a bidirectional multi-drop bus, in accordance with one or more embodiments of the present disclosure. According to some embodiments, method 400 preferably begins at step 402. Teachings of the present disclosure may be implemented in a variety of configurations of multi-drop busses. As such, the preferred initialization point for method 400 and the order of the steps comprising method 400 may depend on the implementation chosen.

At step 402, a variable i, representing a particular drop under consideration, may be initialized to zero. Zero corresponds to a drop on multi-drop bus 206 furthest from a particular driver on the bus. A constant N, which is discussed elsewhere below, may represent total number of drops present on multi-drop bus 206. At step 404, an impedance value $Z_{effi}$ for an effective resistance seen at drop i in a direction away from the particular driver may be calculated. In addition, an impedance value $Z_{effi-}$ for an effective resistance seen at drop i in a direction toward the particular driver may be calculated.

At step 406, a transmission line of multi-drop bus 206 between drop i and next successive drop i+1 (or in the case where i=N, a transmission line between drop i and the particular driver) may be manufactured based on the values of $Z_{effi}$ and $Z_{effi-}$. For example, if a receiver 216 associated with the effective impedance $Z_{effi}$ or $Z_{effi-}$ is terminated, the transmission line may be manufactured such that its impedance 210 has a value $Z_{Ti}=(Z_{effi}+Z_{effi-})/2$. On the other hand, if a receiver 216 associated with the effective impedance $Z_{effi}$ or $Z_{effi-}$ is not terminated, the transmission line may be manufactured such that its impedance 210 has a value $Z_{Ti}=(Z_{effi}+Z_{effi-})/4$. Any suitable method may be used to manufacture a transmission line of multi-drop bus 206 with its desired impedance, including manufacturing a printed circuit board trace comprising the portion of multi-drop bus 206 corresponding to the transmission line to a particular trace width.

At step 408, it may be determined whether all N drops of multi-drop bus 206 have been considered. If all drops have been considered, method 400 may end. Otherwise, method 400 may proceed to step 410.

At step 410, the variable i may be incremented by one, and steps 404 through 408 may repeat for the next successive drop.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using any system operable to implement method 400. In certain embodiments, method 400 may be implemented partially or fully in software and/or firmware embodied in computer-readable media. In these and other embodiments, method 400 may be performed in whole or part by an information handling system, for example information handling system 102 depicted in FIG. 1.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a driver;
   a plurality of drops; and
   a plurality of transmission lines, including one transmission line between the driver and one of the plurality of drops and one transmission line between successive adjacent drops;
   wherein each of the particular transmission lines is manufactured to have a desired impedance equal to one half of a corresponding effective impedance of the particular transmission line as seen at a drop located on an end of the particular transmission line furthest from the driver in a direction away from the driver.

2. The system of claim 1, further comprising a plurality of connectors, each connector corresponding to an associated drop of the plurality of drops and configured to electrically couple a component disposed in the connector to a multi-drop bus.

3. A system of claim 1, comprising:
   a driver;
   a plurality of drops; and
   a plurality of transmission lines, including one transmission line between the driver and one of the plurality of drops and one transmission line between successive adjacent drops;
   wherein each of the particular transmission lines is manufactured to have desired impedance based on a first corresponding effective impedance of the particular transmission line as seen at a drop located on an end of the particular transmission line furthest from the driver in a direction away from the driver and a second corresponding effective impedance as seen at the drop located on the end of the particular transmission line furthest from the driver in a direction towards the driver.

4. The system of claim 3, wherein each of the particular transmission lines is manufactured to have the desired impedance equal to one-half of a sum of the corresponding effective impedance of the particular transmission line and the second corresponding effective impedance of the particular transmission line.

5. The system of claim 3, wherein each of the particular transmission lines is manufactured to have the desired impedance equal to one-fourth of a sum of the corresponding effective impedance of the particular transmission line and the second corresponding effective impedance of the particular transmission line.

6. An information handling system comprising:
   a processor; and
   an information handling resource communicatively coupled to the processor, the information handling resource comprising a multi-drop bus having:
      a driver;
      a plurality of drops; and
      a plurality of transmission lines, including one transmission line between the driver and one of the plurality of drops and one transmission line between successive adjacent drops;
      wherein each of the particular transmission lines is manufactured to have a desired impedance equal to one half of a corresponding effective impedance of the particular transmission line as seen at a drop located on an end of the particular transmission line furthest from the driver in a direction away from the driver.

7. The information handling system of claim 6, the information handling resource further comprising a plurality of connectors, each connector corresponding to an associated drop of the plurality of drops and configured to electrically couple a component disposed in the connector to the multi-drop bus.

8. An information handling system comprising:
   a processor; and
   an information handling resource communicatively coupled to the processor, the information handling resource comprising a multi-drop bus having:
      a driver;
      a plurality of drops; and
      a plurality of transmission lines, including one transmission line between the driver and one of the plurality of drops and one transmission line between successive adjacent drops;
      wherein each of the particular transmission lines is manufactured to have desired impedance based on a first corresponding effective impedance of the particular transmission line as seen at a drop located on an end of the particular transmission line furthest from the driver in a direction away from the driver a second corresponding effective impedance as seen at the drop located on the end of the particular transmission line furthest from the driver in a direction towards the driver.

9. The information handling system of claim 8, wherein each of the particular transmission lines is manufactured to have the desired impedance equal to one-half of a sum of the corresponding effective impedance of the particular transmission line and the second corresponding effective impedance of the particular transmission line.

10. The information handling system of claim 8, wherein each of the particular transmission lines is manufactured to have the desired impedance equal to one-fourth of a sum of the corresponding effective impedance of the particular transmission line and the second corresponding effective impedance of the particular transmission line.

11. A method comprising:
    calculating, for one or more particular drops in a multi-drop bus, a corresponding effective impedance as seen at the drop in a direction away from a driver driving a signal onto the multi-drop bus; and
    manufacturing a transmission line for which the drop is at an end of the transmission line furthest from the driver to have a desired impedance equal to one half the corresponding effective impedance of the particular transmission line.

12. A method comprising:
    calculating, for one or more particular drops in a multi-drop bus, a corresponding effective impedance as seen at the drop in a direction away from a driver driving a signal onto the multi-drop bus; and
    manufacturing a transmission line for which the drop is at an end of the transmission line furthest from the driver to have a desired impedance based on a first corresponding effective impedance of the particular transmission line as seen at a drop located on an end of the particular transmission line furthest from the driver in a direction away from the driver and a second corresponding effective impedance as seen at the drop in a direction towards the driver.

13. The method of claim 12, wherein manufacturing the transmission line comprises manufacturing the transmission line to have the desired impedance equal to one-half of a sum of the corresponding effective impedance of the particular transmission line and the second corresponding effective impedance of the particular transmission line.

14. The method of claim 12, wherein manufacturing the transmission line comprises manufacturing the transmission line to have the desired impedance equal to one-fourth of a sum of the corresponding effective impedance of the particular transmission line and the second corresponding effective impedance of the particular transmission line.

\* \* \* \* \*